(12) United States Patent
Kai

(10) Patent No.: US 7,152,878 B2
(45) Date of Patent: Dec. 26, 2006

(54) AIR BAG SYSTEM

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 284 days.

(21) Appl. No.: 10/824,284

(22) Filed: Apr. 13, 2004

(65) Prior Publication Data

US 2004/0212186 A1    Oct. 28, 2004

(30) Foreign Application Priority Data

Apr. 22, 2003    (JP) .............................. 2003-117443

(51) Int. Cl.
*B60R 21/16* (2006.01)
(52) U.S. Cl. .................................. 280/743.2
(58) Field of Classification Search ............. 280/743.2, 280/743.1
See application file for complete search history.

(56) References Cited

U.S. PATENT DOCUMENTS 5,498,031 A * 3/1996 Kosugi .................... 280/743.2
5,727,812 A   3/1998 Dykstra et al.
6,502,858 B1 * 1/2003 Amamori ................. 280/743.2
6,962,366 B1 * 11/2005 Fukuda et al. ........... 280/743.1

FOREIGN PATENT DOCUMENTS

| JP | 3048988 | 11/1998 |
|---|---|---|
| JP | 3001-301556 | 10/2001 |
| JP | 2001-310696 | 11/2001 |
| JP | 3353463 | 9/2002 |

* cited by examiner

*Primary Examiner*—Eric Culbreth
(74) *Attorney, Agent, or Firm*—Hamre, Schumann, Mueller & Larson, P.C.

(57) ABSTRACT

Three apex portions of a triangular air bag 32 are folded toward a central portion of the air bag, respectively, so that the respective apex portions and a retainer are coupled together by a restricting member 39, and thereafter, the air bag 32 is folded up into an appropriate shape. In an earlier stage of deployment of the air bag 32, the inflation of the air bag 32 to its maximum capacity is restricted by the restricting member 39, whereby the air bag 32 is allowed to inflate quickly to a capacity which is smaller than its maximum capacity, thereby making it possible to get the air bag 32 ready for restraining an occupant. In a later stage of deployment of the air bag 32 that occurs thereafter, when an internal pressure of the air bag 32 reaches or exceeds a predetermined value, the restricting member 39 breaks or extends.

12 Claims, 10 Drawing Sheets

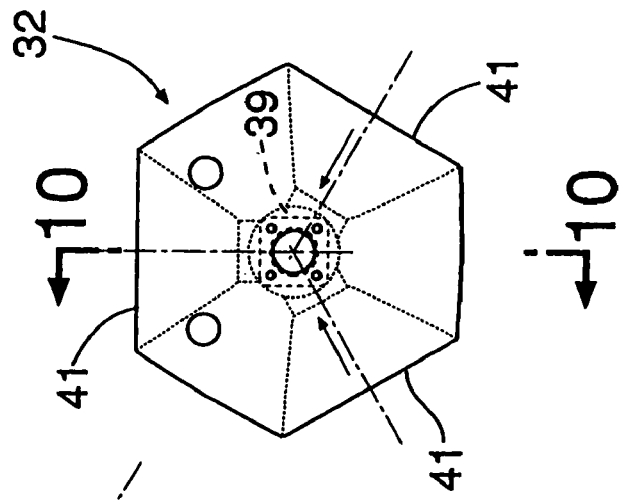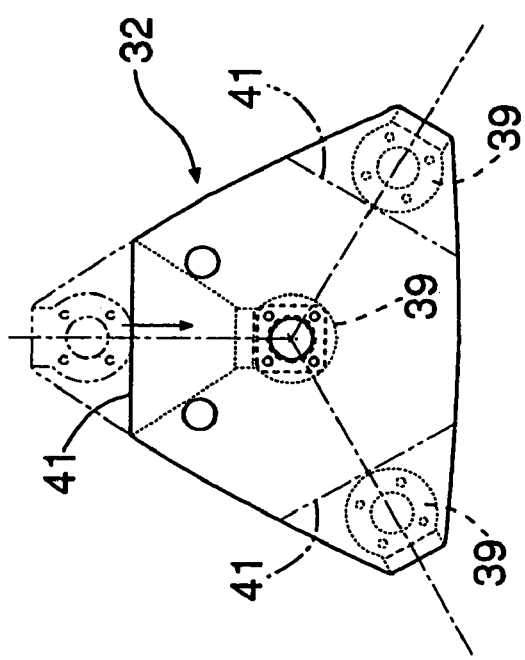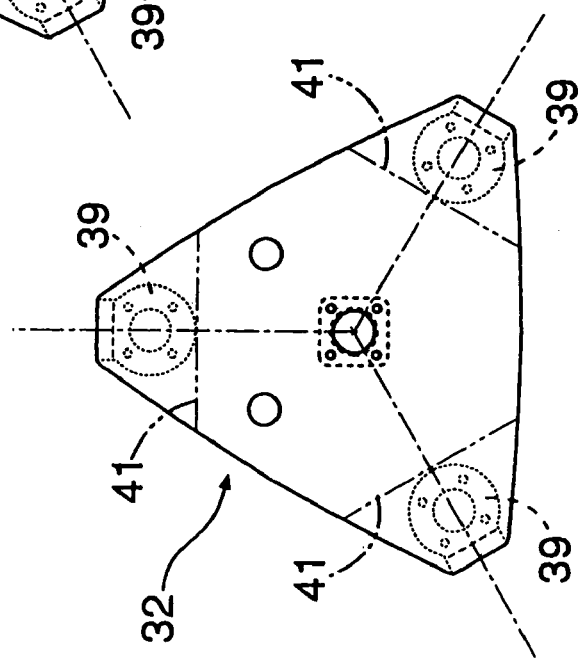

AIR BAG SYSTEM

BACKGROUND OF THE INVENTION

The present invention relates to an air bag system in which a folded air bag and an inflator are supported on a retainer, so that the air bag is inflated to be deployed into a passenger compartment of a vehicle by a gas produced by the inflator at the time of collision.

An air bag system is known from Japanese Patent Publication No. 3353463 in which locations on an internal surface of an air bag adapted to be deployed into a passenger compartment of a vehicle by a gas supplied from an inflator at the time of collision of the vehicle are coupled together by a string-like body, so that an increase in the capacity of the air bag is restricted by virtue of a tension produced by the string-like body at the time of deployment of the air bag, whereas, when an internal pressure of the air bag reaches a predetermined value as the result of secondary collision of an occupant against the air bag, the string-like body stretches or breaks so as to allow a further increase in the capacity of the air bag to thereby increase the performance of restraining the occupant.

With the aforesaid conventional air bag system, however, a job of attaching the string-like body to the interior of the air bag is troublesome, increasing the processing costs. Moreover, controlling the configuration of the air bag in the deployment step as required is difficult with the tension of the string-like body.

SUMMARY OF THE INVENTION

The invention is made in view of the situations, and an object thereof is to enable the controlling of the configuration of the air bag in the deployment step without providing such a restricting member in the interior of the air bag.

With a view to attaining the object, according to a first aspect of the invention, there is proposed an air bag system in which a folded air bag and an inflator are supported on a retainer, so that the airbag is inflated to be deployed into a passenger compartment of a vehicle by a gas produced by the inflator at the time of collision, wherein a plurality of apex portions of the polygonal air bag are folded towards a central portion of the air bag, respectively, so that the apex portions and the retainer are coupled together by a restricting member, whereby the inflation of the airbag to its maximum capacity is restricted by the restricting member in an earlier stage of deployment, whereas in a later stage of deployment, when an internal pressure of the air bag increases to a predetermined value or higher, the restricting member breaks or extends so as to allow the air bag to be inflated to its maximum capacity.

According to the construction that is described above, since the apex portions of the polygonal air bag are folded towards the central portion of the air bag, respectively, so that the apex portions and the retainer are coupled by the restricting member, the restricting member produces the tension to thereby resist the deployment of the air bag in the earlier deployment stage, whereby the air bag is inflated quickly to a capacity which is smaller than the maximum capacity thereof so as to become ready for restraining the occupant quickly in the earlier deployment stage. Thereafter, in the later stage of deployment, when the internal pressure increases to the predetermined value or higher, the restricting member breaks or extends, whereby the air bag is allowed to inflate to the maximum capacity thereof so as to exhibit a sufficient performance for restraining the occupant.

In particular, by folding the apex portions of the polygonal air bag towards the central portion of the air bag, the configuration of the air bag in the earlier stage of deployment can be maintained properly.

According to a second aspect of the invention, there is proposed an air bag system in which a folded air bag and an inflator are supported on a retainer, so that the air bag is inflated to be deployed into a passenger compartment of a vehicle by a gas produced by the inflator at the time of collision, wherein a plurality of apex portions of the polygonal air bag are pushed inwardly towards a central portion of the air bag, respectively, so that the apex portions and the retainer are coupled together by a restricting member, whereby the inflation of the air bag to its maximum capacity is restricted by the restricting member in an earlier stage of deployment, whereas in a later stage of deployment, when an internal pressure of the air bag increases to a predetermined value or higher, the restricting member breaks or extends so as to allow the air bag to be inflated to its maximum capacity.

According to the construction that is described above, since the plurality of apex portions of the polygonal air bag are pushed inwardly towards the central portion of the air bag, respectively, so that the apex portions and the retainer are coupled together by the restricting member, the restricting member produces the tension to thereby resist the deployment of the air bag in the earlier deployment stage, whereby the air bag is inflated quickly to a capacity which is smaller than the maximum capacity thereof so as to become ready for restraining the occupant quickly in the earlier deployment stage. Thereafter, in the later stage of deployment, when the internal pressure increases to the predetermined value or higher, the restricting member breaks or extends, whereby the air bag is allowed to inflate to the maximum capacity thereof. Bo as to exhibit a sufficient performance for restraining the occupant. In particular, by pushing the apex portions of the polygonal air bag inwardly thereof towards the central portion of the air bag, the configuration of the air bag in the earlier stage of deployment can be maintained properly.

BRIEF DESCRIPTION OF THE DRAWINGS

FIGS. 9A to SC are drawings illustrating a third embodiment, which correspond to the drawings in FIGS. 6A–C.

DETAILED DESCRIPTION OF THE PREFERRED EMBODIMENTS

Modes for carrying out the invention will be described based on embodiments illustrated in the accompanying drawings.

Figure 1:
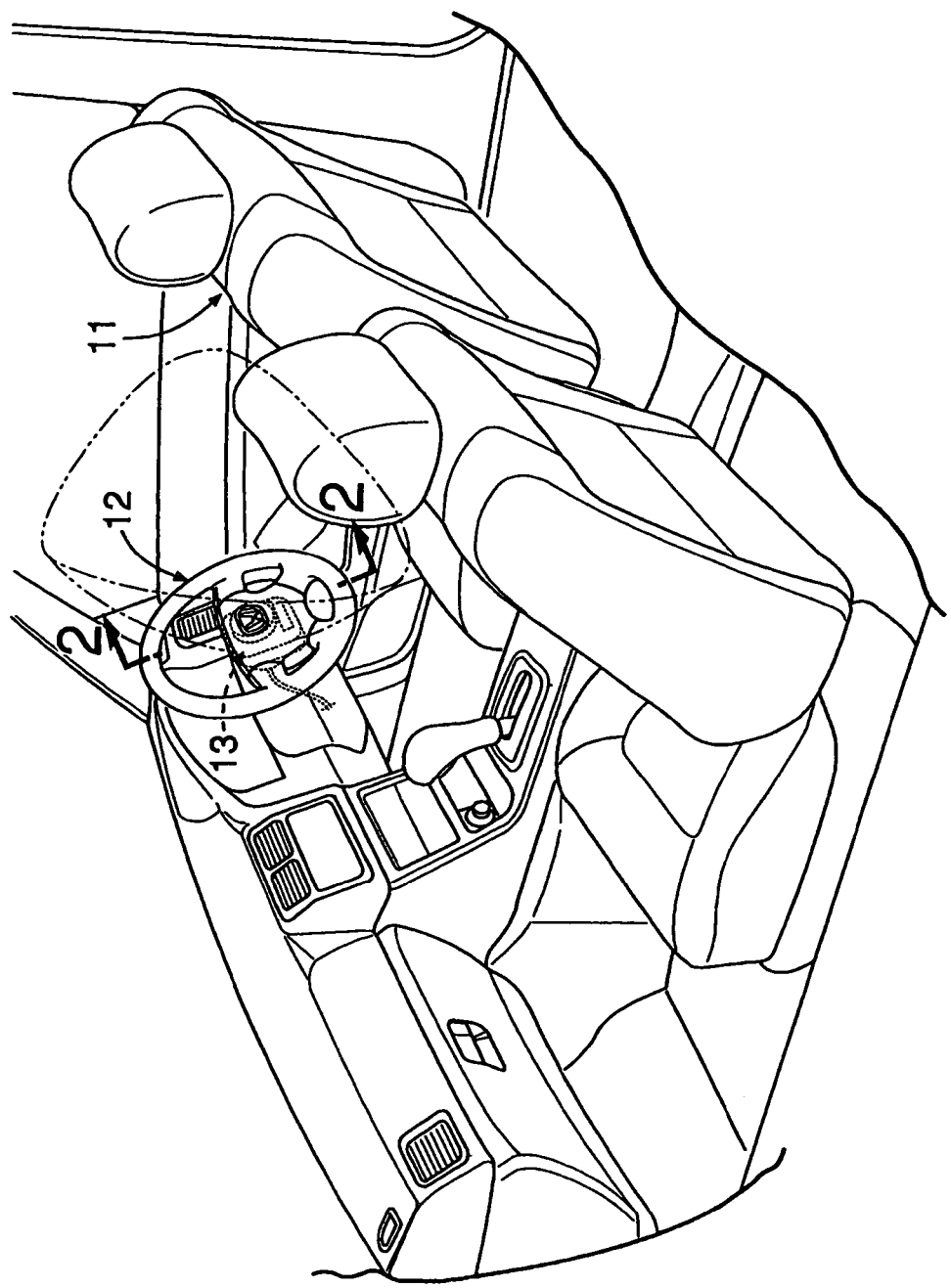
FIG. 1 is a perspective view of a front part of a passenger compartment of an automobile.
Figure 2:
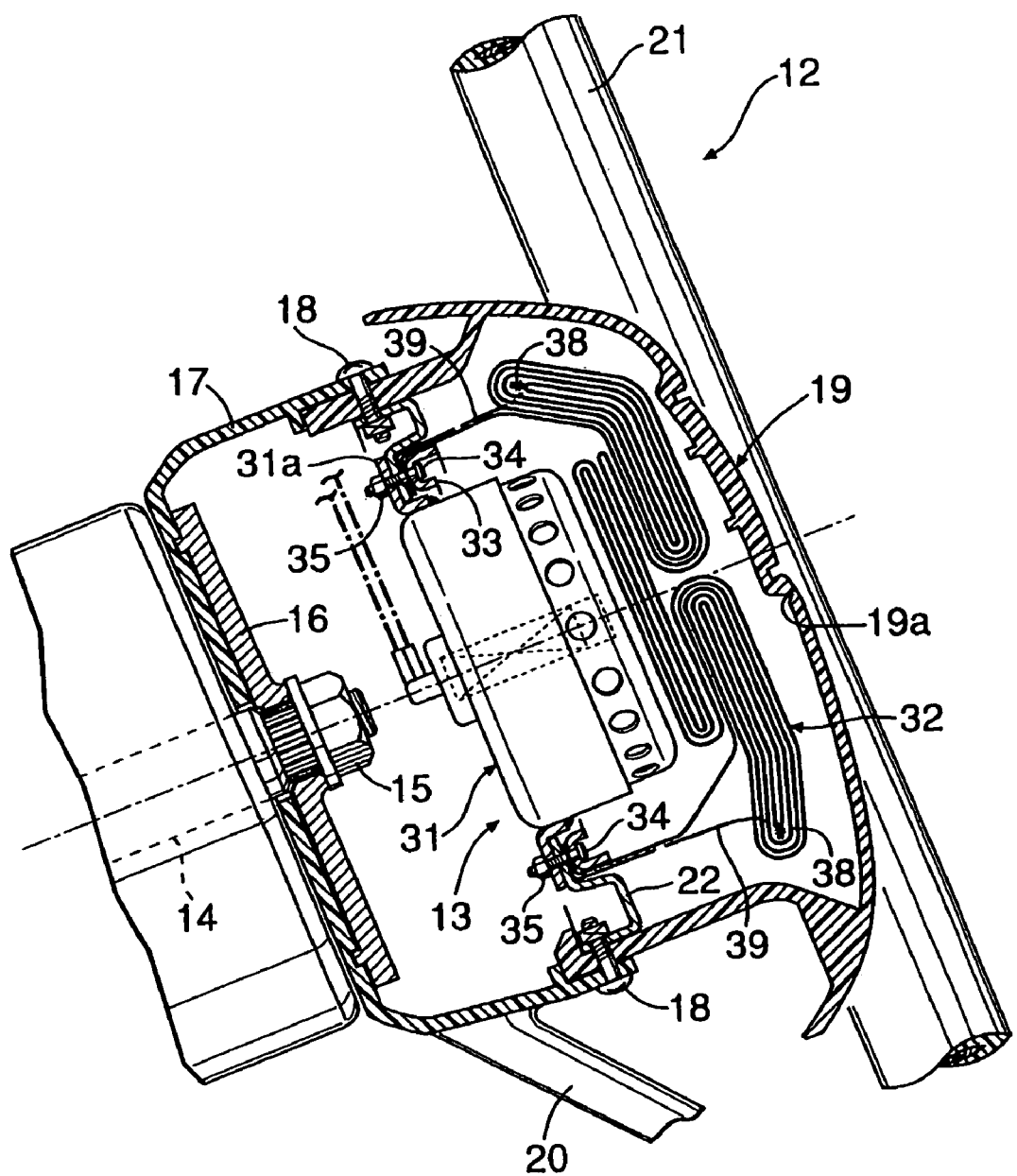
FIG. 2 is an enlarged cross-sectional view taken along the line 2—2 in FIG. 1.
Figure 3:
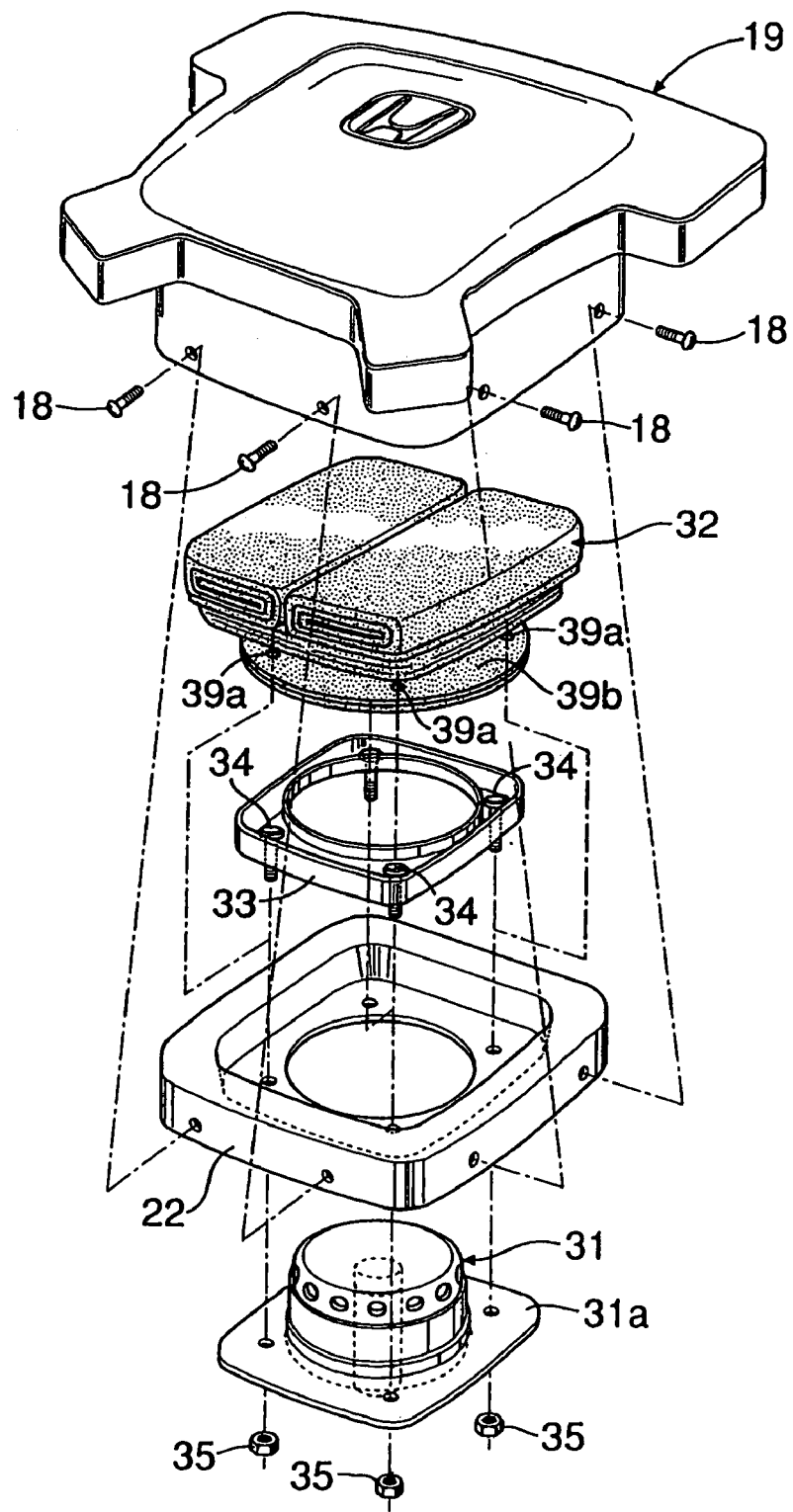
FIG. 3 is an exploded perspective view of an air bag module.
Figure 4:
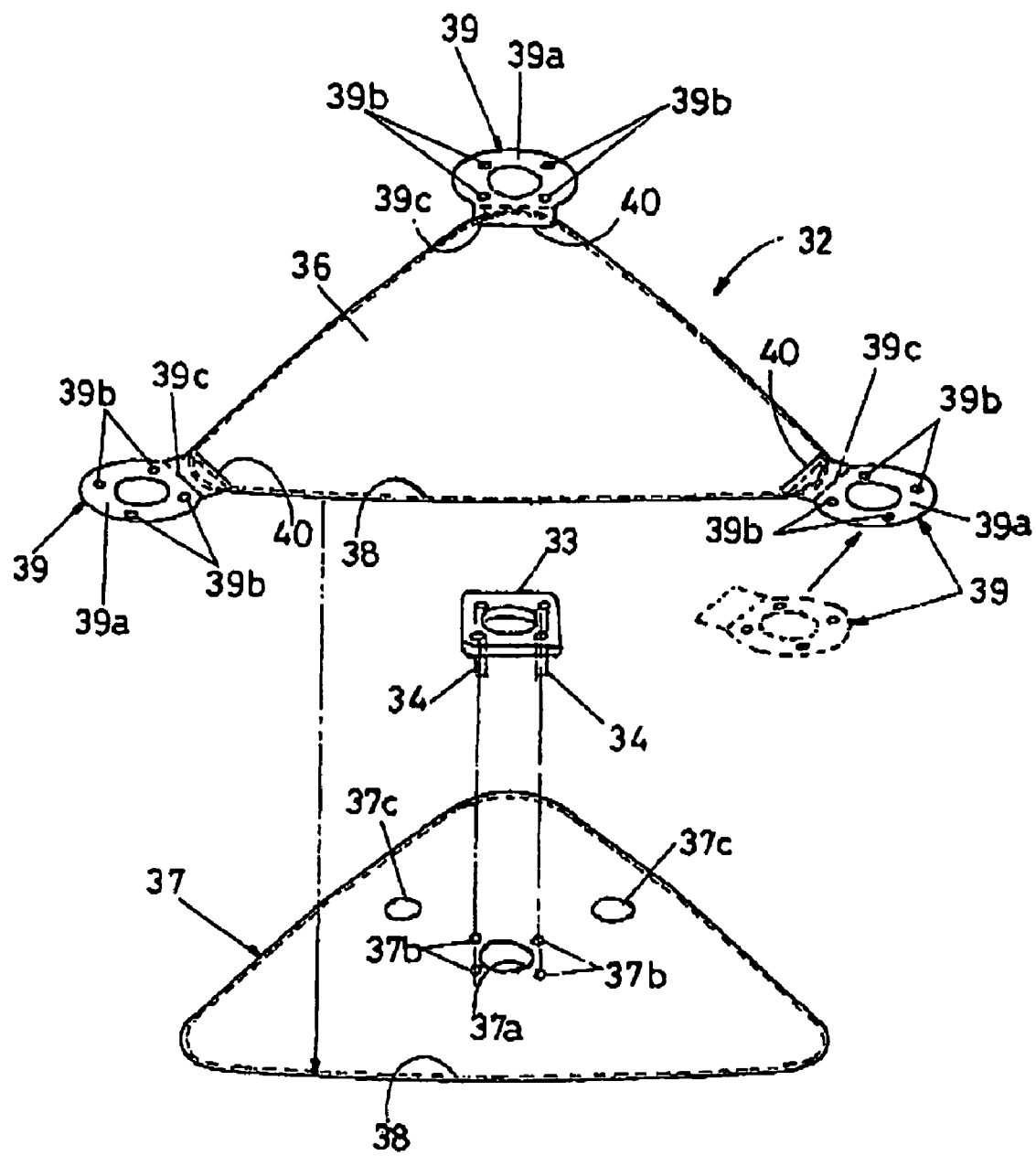
FIG. 4 is an exploded perspective view of an air bag.
Figure 5:
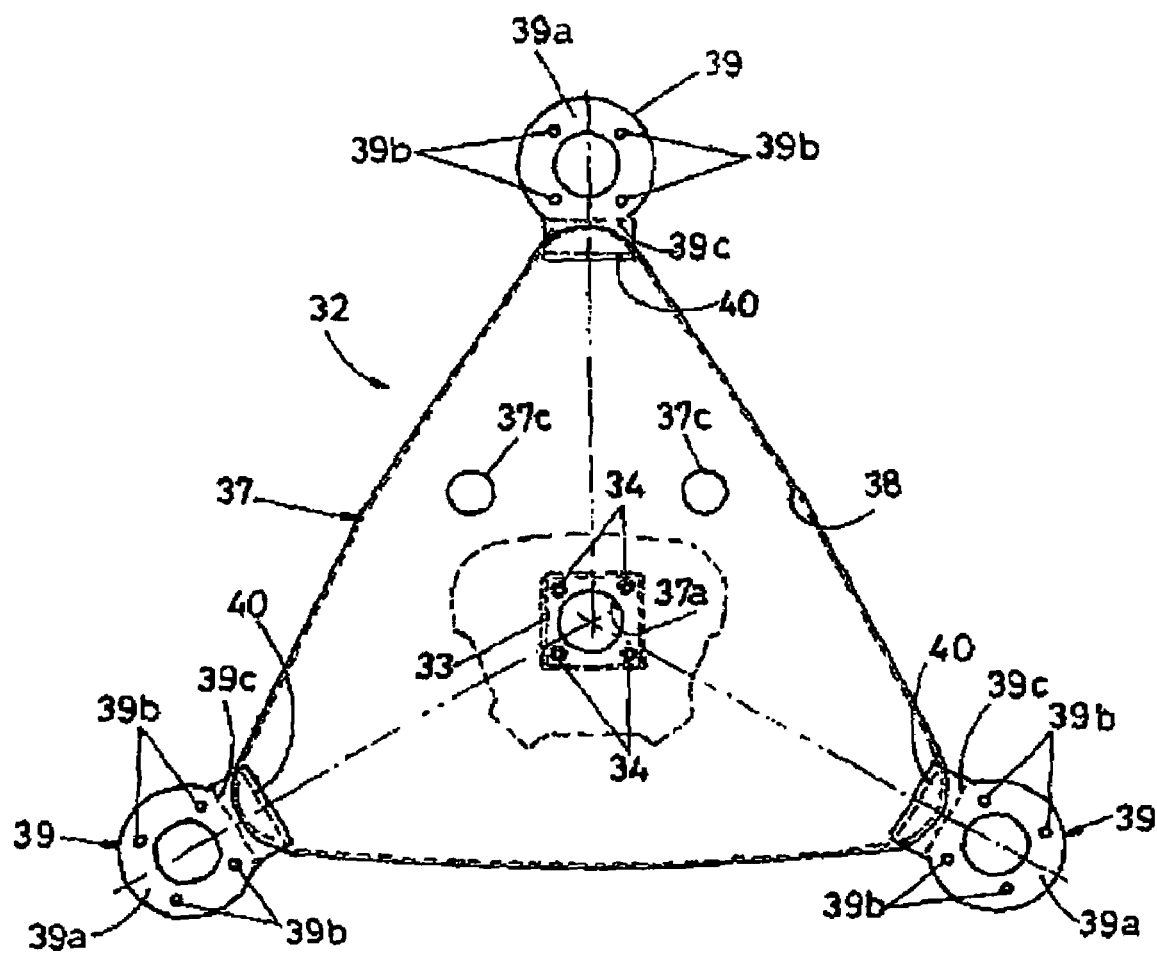
FIG. 5 is a plan view of the air bag.
Figure 6:
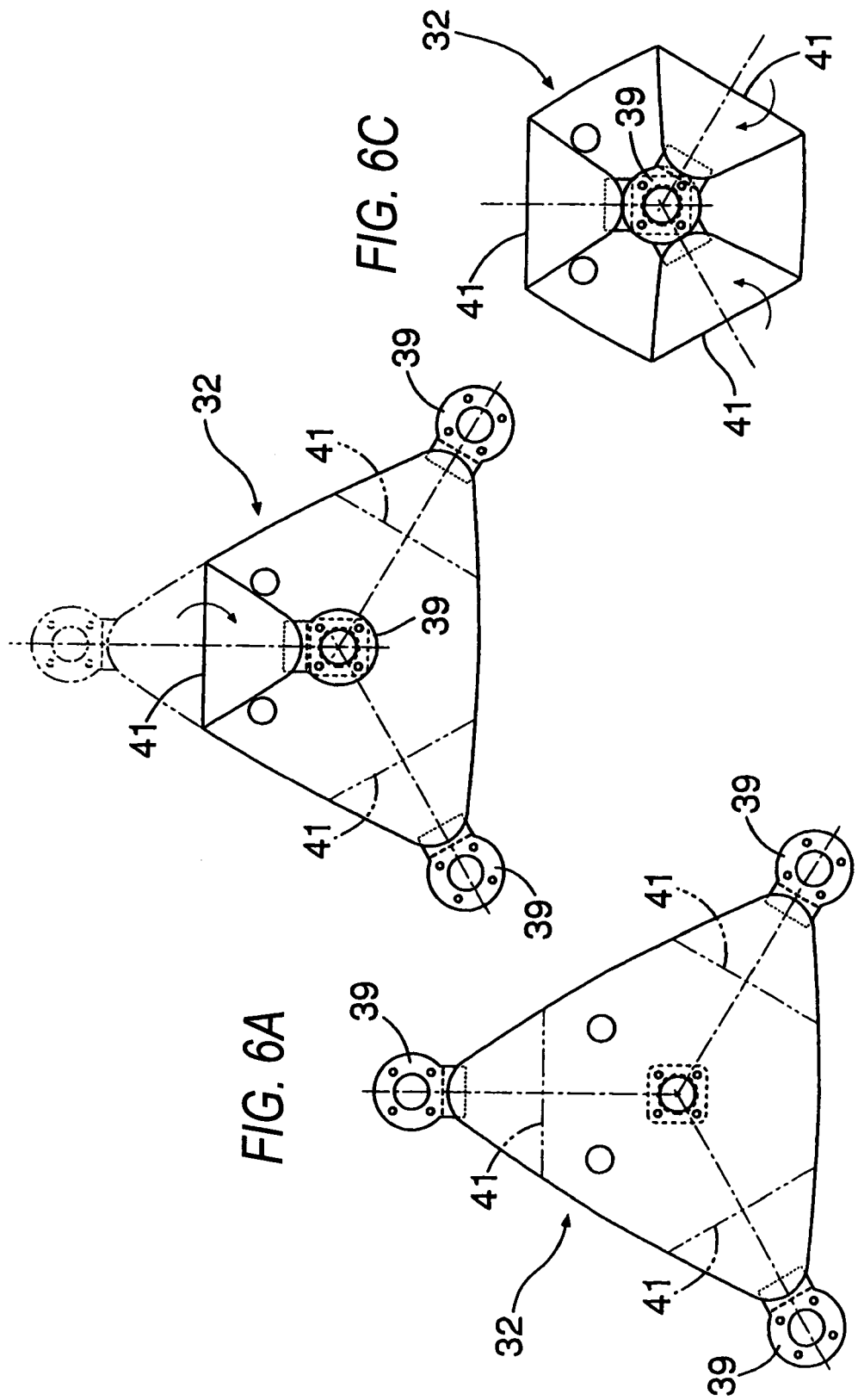
FIGS. 6A to 6C are explanatory drawings which explain a sequence in which the air bag is folded.
Figure 7:
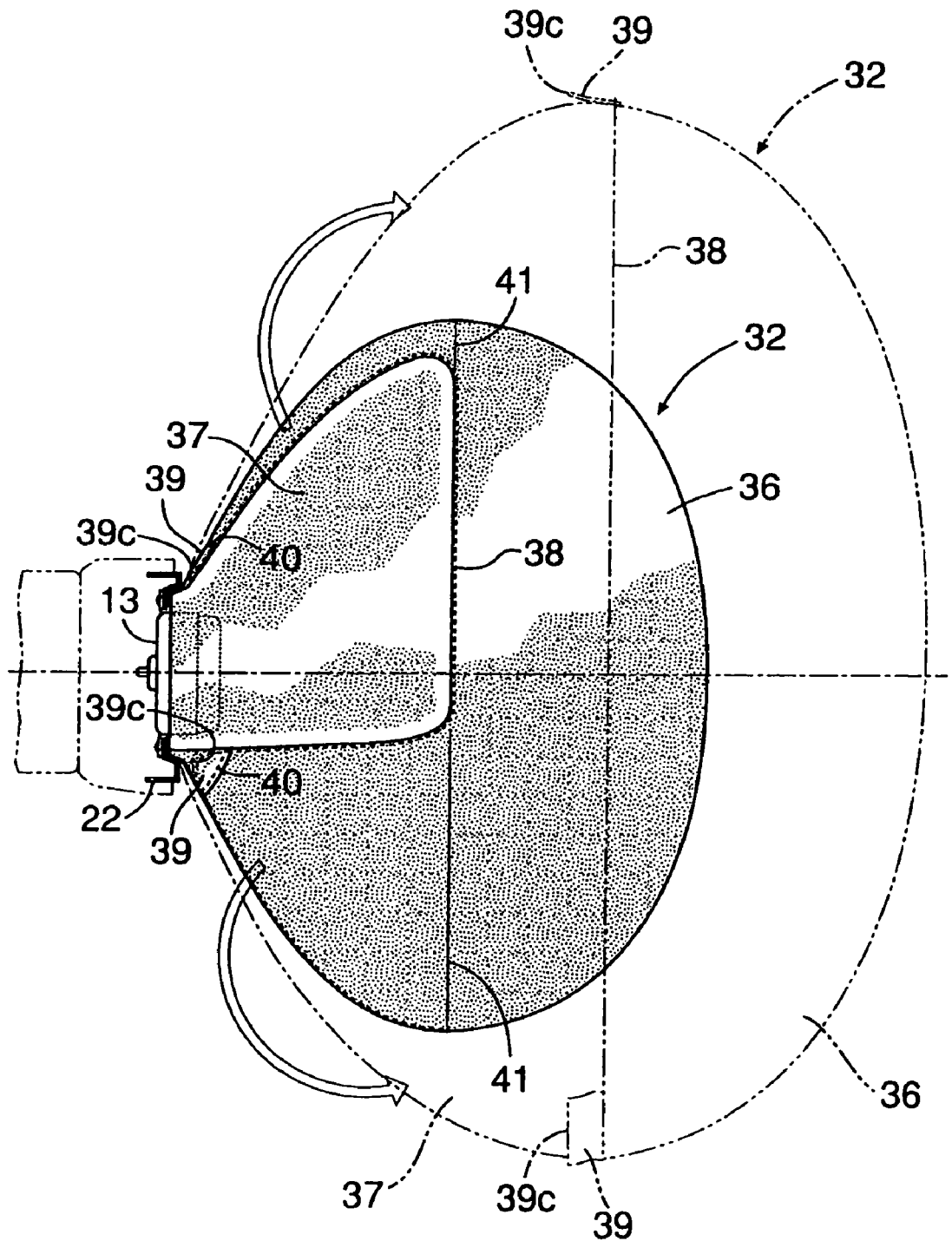
FIG. 7 is an explanatory drawing which explains a deployment process of the air bag.

FIGS. 1 to 7 illustrates a first embodiment, in which FIG. 1 is a perspective view of a front part of a passenger compartment of an automobile, FIG. 2 is an enlarged cross-sectional view taken along the line 2—2 in FIG. 1, FIG. 3 an exploded perspective view of an air bag module, FIG. 4 is an exploded perspective view of an air bag, FIG. 5 is a plan view of the air bag, FIGS. 6A to 6C are explanatory views which explain a sequence in which the air bag is folded, and FIG. 7 is an explanatory view which explains an operation of the air bag in a deployment stage thereof.

As shown in FIG. 1, an airbag module 13 for a driver's seat 11 is accommodated in the interior of a steering wheel 12 disposed in front of the driver's seat 11.

As shown in FIGS. 2 and 3, the steering wheel 12 includes boss portion 16 fixed to a rear end of a steering shaft 14 with a nut 15, a front cover 17 fixed to the boss portion 16, a rear cover 19 fixed to an inner side of the front cover 17 at a rear end thereof with bolts 18, a plurality of spoke portions 20 extending radially from the front cover 17 and a steering wheel main body portion 21 which continues from radially outward ends of the spoke portions 20 and extends circumferentially. A retainer 22 is fastened to an inner circumferential surface of the rear cover 19 with the bolts 18, and the air bag module 13 is supported on the retainer 22. A thin tearable line 19a (refer to FIG. 2) is formed in an inner surface of the rear cover 19 in such a manner as to be torn when an air bag 32 is inflated.

The air bag module 13 includes an inflator 31 filled with a propelling powder which generates a high-pressure gas when burned, the air bag 32 formed by sewing together pieces of base fabric and a fixing ring 33 to which a base portion of the air bag 32 is fixed. A flange 31a formed around an outer circumference of the inflator 31 and the fixing ring 33 are superimposed on front and rear sides of the retainer 22, respectively, so as to be fixed thereto with bolts 34 and nuts 35 which are provided on the fixing ring 33. As this occurs, the base portion of the air bag 32 is held between the rear side of the retainer 22 and the fixing ring 33 so as to be secured in place therebetween.

As shown in FIGS. 4 and 5, the air bag 32 is formed into a triangular shape whose apexes are rounded and includes a first basic fabric 36 positioned on a rear side (a side facing the occupant) of the air bag 32 and a second base fabric 37 which is overlapped on a front side of the first base fabric 36, and the first and second fabrics 36, 37 are sewn together at a sewing portion 38 situated along outer circumferences of the first and second base fabrics 36, 37. A circular opening 37a which surrounds the inflator 31, two vent holes 37c, 37c for releasing part of the gas in a later stage of deployment of the air bag 32, and four bolt holes 37b for allowing four bolts 34 to pass therethrough, respectively, are formed in a center of the second base fabric 37 which constitutes the base portion of the air bag 32.

Three fabric restricting members 39 are sewn to three apex portions of the triangular air bag 32, respectively, at respective sewing portions 40 situated at one ends of the restricting members 39. Each restricting member 39 has at the other end thereof an annular fixing portion 39a in which four holt holes 39b are formed and at an appropriate position thereof a sewing line-like brittle portion 39c adapted to break when a tension exceeding a predetermined value is applied thereto.

As shown in FIGS. 6A to 6C, the triangular air bag 32 is folded up forward (onto the second base fabric 37) at three folding lines 41 which face the three apex portions, respectively, in such a manner that the three restricting members 39 are overlapped each other and are then fastened to the retainer 22 with the bolts 34 which pass through the bolt holes 39b. The air bag 32, which is formed into a substantially hexagonal shape in this state, is folded further into a smaller shape in an appropriate sequence so as to be accommodated in the interior of the rear cover 19.

Thus, when an acceleration which is equal to or greater than a predetermined value is detected at the time of collision of the vehicle, the inflator 31 is ignited, and the airbag 32 which is so folded then starts to inflate by the gas generated by the inflator 31. When a pressure resulting from the inflation of the air bag 32 is applied to the rear cover 19, the rear cover 19 breaks at the tearable line 19a, and the air bag 32 is allowed to deploy into the passenger compartment through an opening formed by the breakage of the rear cover 19.

As indicated by a solid line in FIG. 7, in an earlier stage of deployment of the air bag 32, the air bag 32 which is attempting to inflate is restricted into a hexagonal shape by the tensions of the three restricting members 39 and hence the air bag 32 cannot be distended to its maximum capacity but only to a capacity which is slightly smaller than its maximum capacity. Thus, the airbag 32 is allowed to be quickly prepared for restraining the occupant by allowing the air bag 32 to inflate to the capacity which is slightly smaller than its maximum capacity in the earlier stage of deployment thereof. When the internal pressure in the air bag 32 reaches or exceeds the predetermined values by the gas supplied from the inflator 31 in the later stage of deployment of the air bag 32, the brittle portions 39 of the three restricting members 39 break as indicated by a chain line, and this releases the apex portions, whereby the air bag 32 is allowed to inflate into the triangular shape where its maximum capacity results to thereby exhibit its maximum occupant restraining performance.

Thus, the deployment process of the air bag 32 can be controlled arbitrarily by providing no string-like body which provides the difficulty in being assembled in the interior of the air bag 32 but by providing the restricting members 39 which are easy to be assembled to the external portions of the air bag 32. Moreover, in the earlier state of deployment of the air bag 32, since the air bag 32 is formed into the hexagonal shape which is closed to a circular shape by folding up the apex portions thereof, even if the resulting capacity is slightly smaller than its maximum capacity, the occupant can be restraind effectively.

Figure 8:
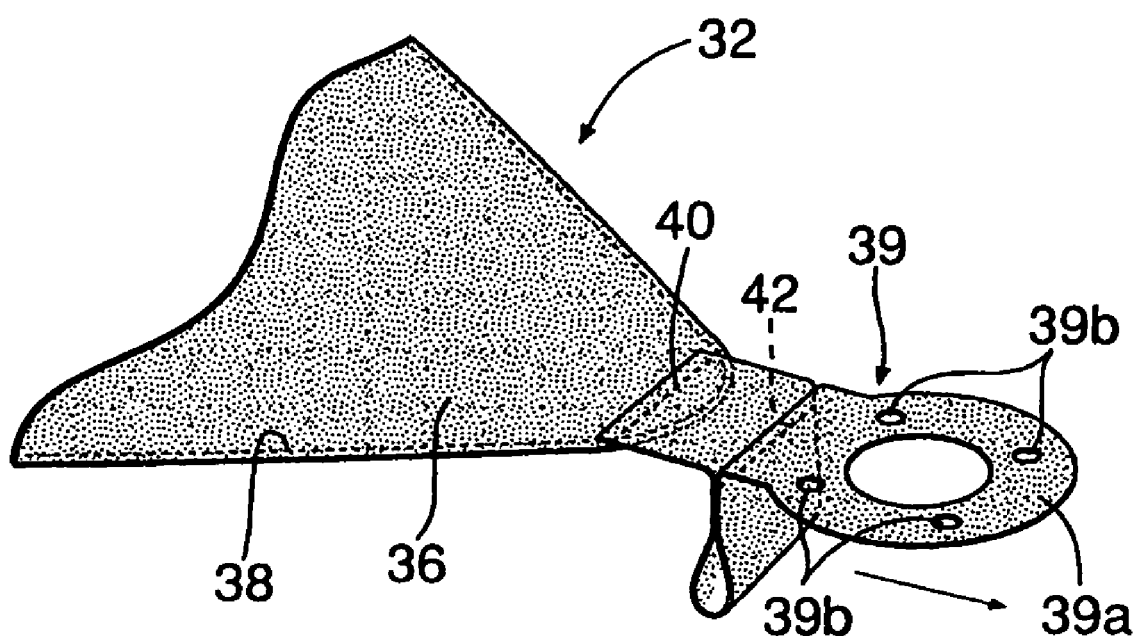
FIG. 8 is a drawing illustrating a restricting member according to a second embodiment of the invention.
Figure 10:
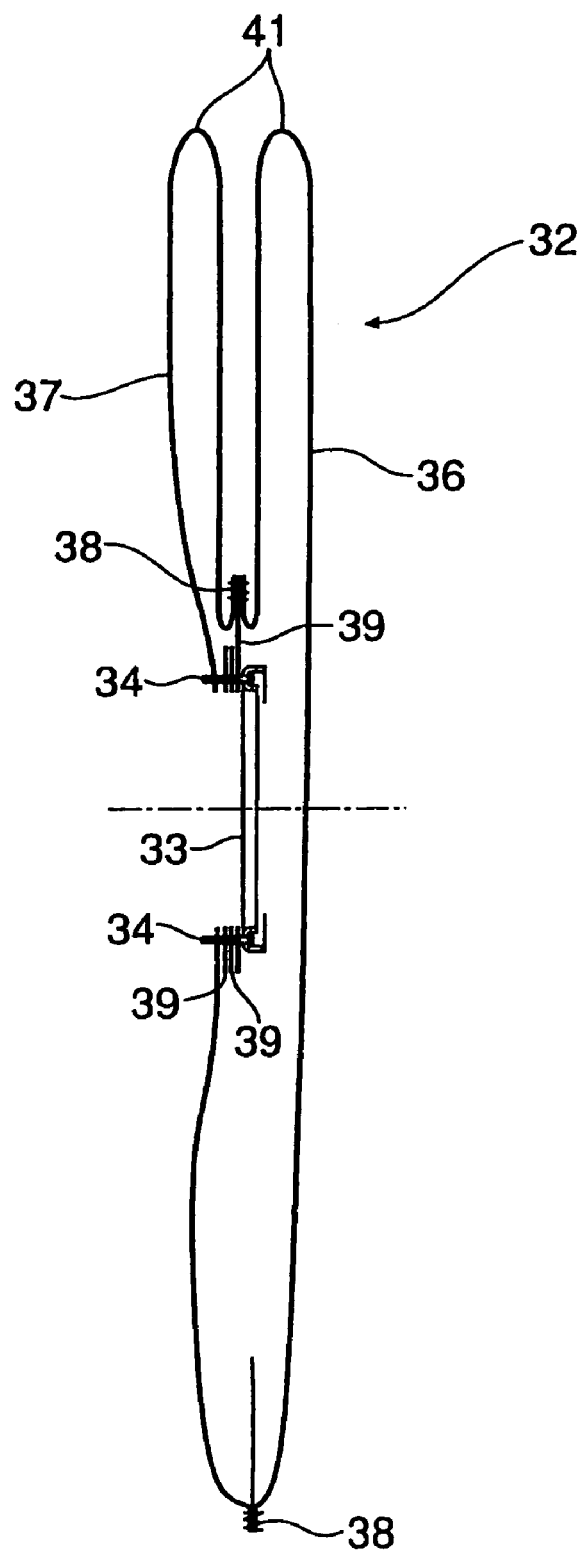
FIG. 10 is a cross-sectional view taken along the line 10—10 in FIG. 9C.

Next, a second embodiment of the invention will be described based on FIG. 8.

While, in the first embodiment, the air bag 32 is allowed to inflate to its maximum capacity by causing the brittle portions 39c provided in the restricting members 39 to break, restricting members 39 provided in a second embodiment are provided with no brittle portions 39c but instead with sewing portions 42 where the restricting member 39 which is formed to have a sufficient length is taken up and sewn at an intermediate portion of the restricting member 39 so as to reduce the length of thereof.

According to this second embodiment, the inflation of the air bag 32 is restricted by virtue of the tensions of the three restricting members 39 in the earlier stage of deployment of the air bag 32, and in the later stage of deployment of the air bag 32, when the internal pressure inside the air bag reaches or exceeds the predetermined value, the sewing portions 42 of the three restricting members 39 break to thereby allow the restricting members 39 to restore their original length, so that the air bag 32 is allowed to inflate to its maximum capacity. Thus, with this second embodiment, too, a similar function and advantage to those attained in the first embodiment can be attained.

Next, a third embodiment of the invention will be described based on FIGS. 9A–C and 10.

In the first and second embodiments that are described heretofore, while the three apex portions of the triangular air bag 32 are folded forward along the three folding lines 41, respectively, in a third embodiment, the three apex portions are pushed inwardly of the air bag 32 in such a manner that a bag is turned inside out, and the fixing portions of the three restricting members 39 are overlapped each other inside the air bag 32 and are then fastened to the retainer 22 with the bolts 34.

Note that while the restricting members 39 of the first and second embodiments protrude outwardly from the apex portions of the air bag 32, the restricting members 39 of the third embodiment are accommodated in the interior of the air bag 32 in advance.

A similar function and advantage to those attained by the first and second embodiment can be attained by the third embodiment, too.

Thus, while the embodiments of the invention are described in detail heretofore, the invention can be modified variously with respect to design without departing from the spirit and scope of the invention.

For example, while the embodiments are illustrated as being applied to the air bag module 13 for the driver's seat, the invention can be applied to an air bag module for use for a front passenger's seat or any other locations of the vehicle.

In addition, while, in the embodiments, the air bag 32 is formed into the triangular shape, the air bag 32 may be formed into a polygonal shape such as a quadrangle.

Additionally, the restricting member 39 is not limited to the fabric member but may be constituted by a string- or thread-member.

According to the first aspect of the invention, since the apex portions of the polygonal air bag are folded towards the central portion of the air bag, respectively, so that the apex portions and the retainer are coupled by the restricting member, the restricting member produces the tension to thereby resist the deployment of the air bag in the earlier deployment stage, whereby the air bag is inflated quickly to a capacity which is smaller than the maximum capacity thereof so as to become ready for restraining the occupant quickly in the earlier deployment stage. Thereafter, in the later stage of deployment, when the internal pressure increases to the predetermined value or higher, the restricting member breaks or extends, whereby the air bag is allowed to inflate to the maximum capacity thereof so as to exhibit a sufficient performance for restraining the occupant. In particular, by folding the apex portions of the polygonal air bag towards the central portion of the air bag, the configuration of the air bag in the earlier stage of deployment can be maintained properly.

According to the second aspect of the invention, since the plurality of apex portions of the polygonal air bag are pushed inwardly towards the central portion of the air bag, respectively, so that the apex portions and the retainer are coupled together by the restricting member, the restricting member produces the tension to thereby resist the deployment of the air bag in the earlier deployment stage, whereby the air bag is inflated quickly to a capacity which is smaller than the maximum capacity thereof so as to become ready for restraining the occupant quickly in the earlier deployment stage. Thereafter, in the later stage of deployment, when the internal pressure increases to the predetermined value or higher, the restricting member breaks or extends, whereby the air bag is allowed to inflate to the maximum capacity thereof so as to exhibit a sufficient performance for restraining the occupant. In particular, by pushing the apex portions of the polygonal air bag inwardly thereof towards the central portion of the air bag, the configuration of the air bag in the earlier stage of deployment can be maintained properly.

What is claimed is:

1. An air bag system comprising:
   an inflator,
   a folded air bag that is inflatable to be deployed into a passenger compartment of a vehicle by a gas produced by the inflator at a time of collision, and prior to being folded the air bag has a polygonal shape with a plurality of apex portions,
   a retainer supporting the air bag and the inflator, and
   a plurality of restricting members, each restricting member being connected to a respective one of said apex portions, the restricting members coupling the plurality of apex portions of the polygonal air bag and the retainer together, and the restricting members overlapping with each other and fixed to the retainer, wherein
   the inflation of the air bag to the maximum capacity thereof is restricted by the restricting members in an earlier stage of deployment, and
   in a later stage of deployment, when an internal pressure of the air bag increases to a predetermined value or higher, the restricting members break so as to allow the air bag to be inflated to the maximum capacity thereof.

2. The air bag system as set forth in claim 1, wherein the plurality of apex portions of the polygonal air bag are respectively folded towards a central portion of the air bag.

3. The air bag system as set forth in claim 1, wherein the plurality of apex portions of the polygonal air bag are respectively pushed inwardly towards a central portion of the air bag.

4. The air bag system as set forth in claim 1, wherein each restricting member includes a hole adjacent an end thereof, and the holes in the restricting members are coaxial with one another when the air bag is folded.

5. The air bag system as set forth in claim 1, wherein a periphery of the airbag extends between adjacent ones of the apex portions, and the periphery between adjacent apex portions is a generally straight line.

6. The air bag system as set forth in claim 1, wherein each apex portion is folded towards a central portion of the air bag at a position closer to each apex portion than a midpoint between the apex portions.

7. An air bag system comprising:
   an inflator,
   a folded air bag that is inflatable to be deployed into a passenger compartment of a vehicle by a gas produced by the inflator at a time of collision, and prior to being folded the air bag has a polygonal shape with a plurality of apex portions,
   a retainer supporting the air bag and the inflator, and
   a plurality of restricting members, each restricting member being connected to a respective one of said apex portions, the restricting members coupling the plurality of apex portions of the polygonal air bag and the retainer together, and the restricting members overlapping with each other and are fixed to the retainer, wherein the inflation of the air bag to the maximum capacity thereof is restricted by the restricting members in an earlier stage of deployment, and in a later stage of deployment, when an internal pressure of the air bag increases to a predetermined value or higher, the restricting members extend so as to allow the air bag to be inflated to the maximum capacity thereof.

8. The air bag system as set forth in claim 7, wherein the plurality of apex portions of the polygonal air bag are respectively folded towards a central portion of the air bag.

9. The air bag system as set forth in claim 7, wherein the plurality of apex portions of the polygonal air bag are respectively pushed inwardly towards a central portion of the air bag.

10. The air bag system as set forth in claim 7, wherein each restricting member includes a hole adjacent an end thereof, and the holes in the restricting members are coaxial with one another when the air bag is folded.

11. The air bag system as set forth in claim 7, wherein a periphery of the airbag extends between adjacent ones of the apex portions, and the periphery between adjacent apex portions is a generally straight line.

12. The air bag system as set forth in claim 7, wherein each apex portion is folded towards a central portion of the air bag at a position closer to each apex portion than a midpoint between the apex portions.

* * * * *